(No Model.)

E. GORSUCH.
TIRE TIGHTENER.

No. 573,780.  Patented Dec. 22, 1896.

Witnesses:
G. M. Anderson
Phil C. Masi.

Inventor.
E. Gorsuch
by E. W. Anderson
his Attorney.

THE NORRIS PETERS CO., PHOTO-LITHO., WASHINGTON, D. C.

UNITED STATES PATENT OFFICE.

EDWARD GORSUCH, OF ROARING SPRING, PENNSYLVANIA.

TIRE-TIGHTENER.

SPECIFICATION forming part of Letters Patent No. 573,780, dated December 22, 1896.

Application filed June 16, 1896. Serial No. 595,818. (No model.)

*To all whom it may concern:*

Be it known that I, EDWARD GORSUCH, a citizen of the United States, and a resident of Roaring Spring, in the county of Blair and State of Pennsylvania, have invented certain new and useful Improvements in Tire-Tighteners; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
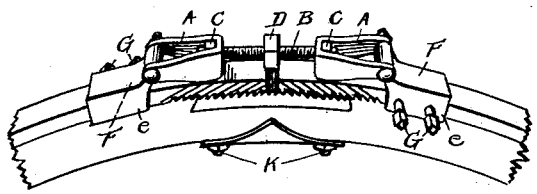
Figure 2:
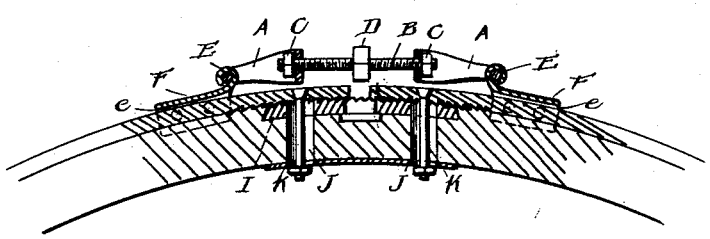
Figure 3:
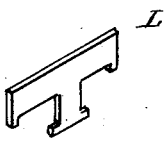

Figure 1 of the drawings is a perspective view of invention as in application. Fig. 2 a sectional view of invention as in application. Fig. 3 is a perspective view of one of the washers.

This invention is designed to provide a device of improved character for use in tightening the tires of vehicle-wheels; and it consists in the novel construction and combination of parts, all as hereinafter described, and pointed out in the appended claim.

Referring to the accompanying drawings, the letters A A designate a pair of yokes or links of approximately U form, which are placed end to end with their closed ends facing each other and are connected by a draw-bolt B, which has oppositely-threaded end portions. These end portions extend loosely through the closed ends of the respective links or yokes and engage the loose nuts C on the inner sides thereof. The central portion of the bolt has a rigid nut or wrench-seat D, by means of which it may be turned.

Secured to the open ends of each of the links or yokes A A is a transverse pin or bolt E, which forms the pivot for the tire-clamp F. These tire-clamps (there being one connected to each of the links or yokes) consist each of a plate having an eye or barrel which loosely engages the pin or bolt E and the lateral flanges e, which embrace the tire. Seated in one of these flanges are clamping-screws G.

The tire having been cut or separated at the point where it is to be tightened, the tightener is applied to the wheel as indicated in the drawings, one of the clamps F being made fast to the tire upon each side of the joint. The bolt B is then turned until the tire has been sufficiently tightened. It is then secured in its new adjustment, and the tightener is removed.

In the drawings I have shown the tightener applied to a tire-coupling of particular character, forming the subject-matter of a separate application and not claimed herein. In this coupling the meeting end portions of the tire are transversely corrugated or serrated on their inner faces, as indicated at H, and are lapped upon a felly-plate I, which is similarly corrugated or serrated on its upper face. This plate, together with the felly, is slotted, as indicated at J, to receive the tire-bolt K. Removable washers L are interposed between the meeting ends of the tire.

Having thus described my invention, what I claim as new, and desire to secure by Letters Patent, is—

The herein-described tire-tightening device, comprising two yokes or links A, A, of approximately U form the draw-bolt B which loosely engages the adjacent end portions of said yokes or links, and whose end portions are oppositely threaded, the loose nuts within said yokes or links and engaging the end portions of said bolt, and the tire-clamps, one of which is pivotally connected to each of said yokes or links, and which consist of flanged plates provided with clamping-screws, substantially as specified.

In testimony whereof I affix my signature in presence of two witnesses.

EDWARD GORSUCH.

Witnesses:
T. Z. REPLOGLE,
S. W. LEAMER.